United States Patent
Bass

(10) Patent No.: US 11,416,124 B2
(45) Date of Patent: Aug. 16, 2022

(54) GRAPHICAL COMPUTER INTERFACE FOR AN ISSUE TRACKING SYSTEM

(71) Applicants: Atlassian Pty Ltd., Sydney (AU); Atlassian Inc., San Francisco, CA (US)

(72) Inventor: Jacob Bass, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/920,139

(22) Filed: Jul. 2, 2020

(65) Prior Publication Data

US 2022/0004296 A1    Jan. 6, 2022

(51) Int. Cl.
| | | |
|---|---|---|
| *G06F 3/0484* | (2022.01) | |
| *G06F 3/0482* | (2013.01) | |
| *G06Q 30/00* | (2012.01) | |
| *G06Q 10/06* | (2012.01) | |

(52) U.S. Cl.
CPC .......... *G06F 3/0484* (2013.01); *G06F 3/0482* (2013.01); *G06Q 10/06316* (2013.01); *G06Q 30/016* (2013.01)

(58) Field of Classification Search
CPC ................ G06F 3/0484; G06F 3/0482; G06F 16/24575; G06F 40/177; G06F 40/18; G06Q 30/016; G06Q 10/06316
USPC .......................... 705/304; 715/824–826, 845
See application file for complete search history.

(56) References Cited

U.S. PATENT DOCUMENTS

| | | | | |
|---|---|---|---|---|
| 5,208,910 A | * | 5/1993 | Higgins | ................ G06F 3/0481 715/820 |
| 6,445,682 B1 | * | 9/2002 | Weitz | .................. H04L 12/2856 370/257 |
| 7,571,387 B1 | * | 8/2009 | Yehuda | .................... H04L 41/22 709/223 |
| 7,958,459 B1 | * | 6/2011 | Mahmood | ............. G06F 16/248 715/808 |
| 10,096,030 B1 | * | 10/2018 | Hayon | ................. G06Q 30/016 |
| 2004/0216055 A1 | * | 10/2004 | Boyles | ................ G06F 3/04842 715/779 |
| 2005/0273729 A1 | * | 12/2005 | Kumashio | ............. G06F 3/0482 715/825 |
| 2006/0242600 A1 | * | 10/2006 | Pradhan | .............. G06F 3/04847 715/831 |

(Continued)

OTHER PUBLICATIONS

Associate multiple incidents with a major incident. Product Manual [online]. ServiceNow, Jan. 23, 2020, [retrieved on Nov. 30, 2021]. Retrieved from the Internet: https://docs.servicenow.com/bundle/orlando-it-service-management/page/product/incident-management/task/asso-multi-inci-with-major-inci.html (Year: 2020).*

*Primary Examiner* — David S Posigian
(74) *Attorney, Agent, or Firm* — Brownstein Hyatt Farber Schreck, LLP

(57) ABSTRACT

Described herein is an issue tracking system (ITS) comprising one or more processors; one or more non-transitory computer-readable storage media storing sequences of instructions which, when executed by the one or more processors, cause the one or more processors to: render a user interface depicting an issues queue that includes two or more issues defined in the ITS; receive in the user interface, a selection of at least two issues; receive in the user interface a section of an action; and launch an operation to apply the selected action to each selected issue.

20 Claims, 16 Drawing Sheets

(56) References Cited

U.S. PATENT DOCUMENTS

| | | | |
|---|---|---|---|
| 2007/0245261 A1* | 10/2007 | Bukovec | G06Q 10/06316 715/810 |
| 2010/0037127 A1* | 2/2010 | Tomasic | G06Q 10/06 715/224 |
| 2014/0236649 A1* | 8/2014 | Hamid | G06Q 10/103 705/7.11 |
| 2014/0337071 A1* | 11/2014 | Stiffler | G06Q 10/06311 705/7.13 |
| 2019/0268354 A1* | 8/2019 | Zettel, II | H04L 63/20 |
| 2020/0090108 A1* | 3/2020 | Gupta | G06Q 10/063114 |
| 2020/0302349 A1* | 9/2020 | Krier | G06Q 10/20 |

* cited by examiner

300

Projects/IncidentManagment/All Tickets 302

ALL Open Tickets 304

308

| | Request Type | Key | Summary | Reporter | Assignee | Status | Created |
|---|---|---|---|---|---|---|---|
| ☐ | A | INC-1 | Sum 1 | A.S | S.I | Pending | 01/01/20 |
| ☐ | B | INC-2 | Sum 2 | K.L | S.I | Waiting | 01/01/20 |
| ☐ | C | INC-3 | Sum 3 | S.P | S.I | Completed | 01/01/20 |
| ☐ | B | INC-4 | Sum 4 | H.S | S.I | Completed | 01/01/20 |
| ☐ | A | INC-5 | Sum 5 | HF | S.I | Pending | 01/01/20 |

Projects/IncidentManag/All Tickets 302

ALL Open Tickets 304

308

410

| | 3 selected | Link | Comment | Assign | Transition | Delete | |
|---|---|---|---|---|---|---|---|
| ☐ | A | INC-1 | Sum 1 | A.S | S.I | Pending | 01/01/20 |
| ✗ | B | INC-2 | Sum 2 | K.L | S.I | Waiting | 01/01/20 |
| ✗ | C | INC-3 | Sum 3 | S.P | S.I | Completed | 01/01/20 |
| ✗ | B | INC-4 | Sum 4 | H.S | S.I | Completed | 01/01/20 |
| ☐ | A | INC-5 | Sum 5 | HF | S.I | Pending | 01/01/20 |

Projects/IncidentManag/All Tickets 302

ALL Open Tickets

| ▨ | 3 selected | Link | Comment | Assign | Transition | Delete | 510 |

| ☐ | A | INC-1 | Sum 1 | | | 01/01/20 |
| ✕ | B | INC-2 | Sum 2 | Issue Type | 520 | 01/01/20 |
| ✕ | C | INC-3 | Sum 3 | Choose an Issue Type | ed 01/01/20 |
| ✕ | B | INC-4 | Sum 4 | Iss 1  2<br>Iss 2  1 | ted 01/01/20 |
| ☐ | A | INC-5 | Sum 5 | | | 01/01/20 |

Projects/IncidentManag/All Tickets 302

ALL Open Tickets

| | 2 selected | Link | Comment | Assign | Transition | Delete | 610 | | |
|---|---|---|---|---|---|---|---|---|---|
| ☐ | A | INC-1 | Sum 1 | | | | | | 01/01/20 |
| ✕ | B | INC-2 | Sum 2 | Issue Type<br>Iss 1 (2) | 620 | | | | 01/01/20 |
| ☐ | C | INC-3 | Sum 3 | Select Transition | | | | ed | 01/01/20 |
| ✕ | B | INC-4 | Sum 4 | Close (2)<br>Back to Work in Progress (2) | | | | ted | 01/01/20 |
| ☐ | A | INC-5 | Sum 5 | | | | | | 01/01/20 |

Projects/IncidentManag/All Tickets 302

ALL Open Tickets

| | | 2 selected | Link | Comment | Assign | Transition | Delete | | |
|---|---|---|---|---|---|---|---|---|---|
| ☐ | A | | INC-1 | Sum 1 | A.S | S.I | | Pending | 01/01/20 |
| ✗ | B | | INC-2 | Sum 2 | K.L | S.I | | Waiting | 01/01/20 |
| ☐ | C | | INC-3 | Sum 3 | S.P | S.I | | Completed | 01/01/20 |
| ✗ | B | | INC-4 | Sum 4 | H.S | S.I | | Completed | 01/01/20 |
| ☐ | A | | INC-5 | Sum 5 | HF | S.I | | Pending | 01/01/20 |

Transitioning two tickets to
Work in Progress

Projects/IncidentManag/All Tickets 302

ALL Open Tickets

| ▨ | 2 selected | Link | Comment | Assign | <u>Transition</u> | Delete | |
|---|---|---|---|---|---|---|---|
| ☐ | A | INC-1 | Sum 1 | A.S | S.I | Pending | 01/01/20 |
| ✕ | B | INC-2 | Sum 2 | K.L | S.I | WIP | 01/01/20 |
| ☐ | C | INC-3 | Sum 3 | S.P | S.I | Completed | 01/01/20 |
| ✕ | B | INC-4 | Sum 4 | H.S | S.I | WIP | 01/01/20 |
| ☐ | A | INC-5 | Sum 5 | HF | S.I | Pending | 01/01/20 |

Success. Two tickets transitioned to Work in Progress

Projects/IncidentManag/Incidents 302

Open incidents

| | Key | Summary | Reporter | Assignee | Status | Created |
|---|---|---|---|---|---|---|
| ☐ | INC-2 | Sum 2 | K.L | S.I | Waiting | 01/01/20 |
| ☐ | INC-4 | Sum 4 | H.S | S.I | Completed | 01/01/20 |

Projects/IncidentManag/Incidents 302

Open incidents 2 selected  Link to major incident  Link  Comment  Assign  Transition  Delete

| | | | | | |
|---|---|---|---|---|---|
| INC-2 | Sum 2 | K.L | S.I | Waiting | 01/01/20 |
| INC-4 | Sum 4 | H.S | S.I | Completed | 01/01/20 |

Success - two tickets to Incident 1

GRAPHICAL COMPUTER INTERFACE FOR AN ISSUE TRACKING SYSTEM

TECHNICAL FIELD

The present disclosure relates to issue tracking systems. In particular, the present disclosure relates to methods, systems and user interfaces for applying actions to issues in an issue tracking system.

BACKGROUND

Many software developers use various planning tools and software trackers to monitor and manage software issues that emerge over time. However, on a large scale, it can be difficult to manage and handle a large number of issues using some traditional interface tools. The systems and techniques described herein may be used to improve the efficiency and effectiveness of an interface to tracking tool.

SUMMARY

Some example embodiments are directed to an issue tracking system (ITS) comprising: one or more processors; and one or more non-transitory computer-readable storage media storing sequences of instructions which, when executed by the one or more processors, cause the one or more processors to perform various operations. The instructions may include instructions for rendering a user interface depicting an issues queue that includes two or more issues defined in the ITS; receiving in the user interface, a selection of at least two issues; receiving in the user interface a section of an action; and launching an operation to apply the selected action to each selected issue.

Some example embodiments are directed to a computer implemented method comprising: rendering, using an issue tracking system (ITS), a user interface depicting an issues queue that includes two or more issues defined in the ITS; receiving in the user interface, a selection of at least two issues; receiving in the user interface a section of an action; and the ITS launching an operation to apply the selected action to each selected issue.

BRIEF DESCRIPTION OF THE DRAWINGS

In the drawings:

FIGS. 3-9 are example user interfaces rendered by an ITS in accordance with a first embodiment of the present disclosure.

FIGS. 10-15 are example user interfaces rendered by an ITS in accordance with a second embodiment of the present disclosure

Figure 1:
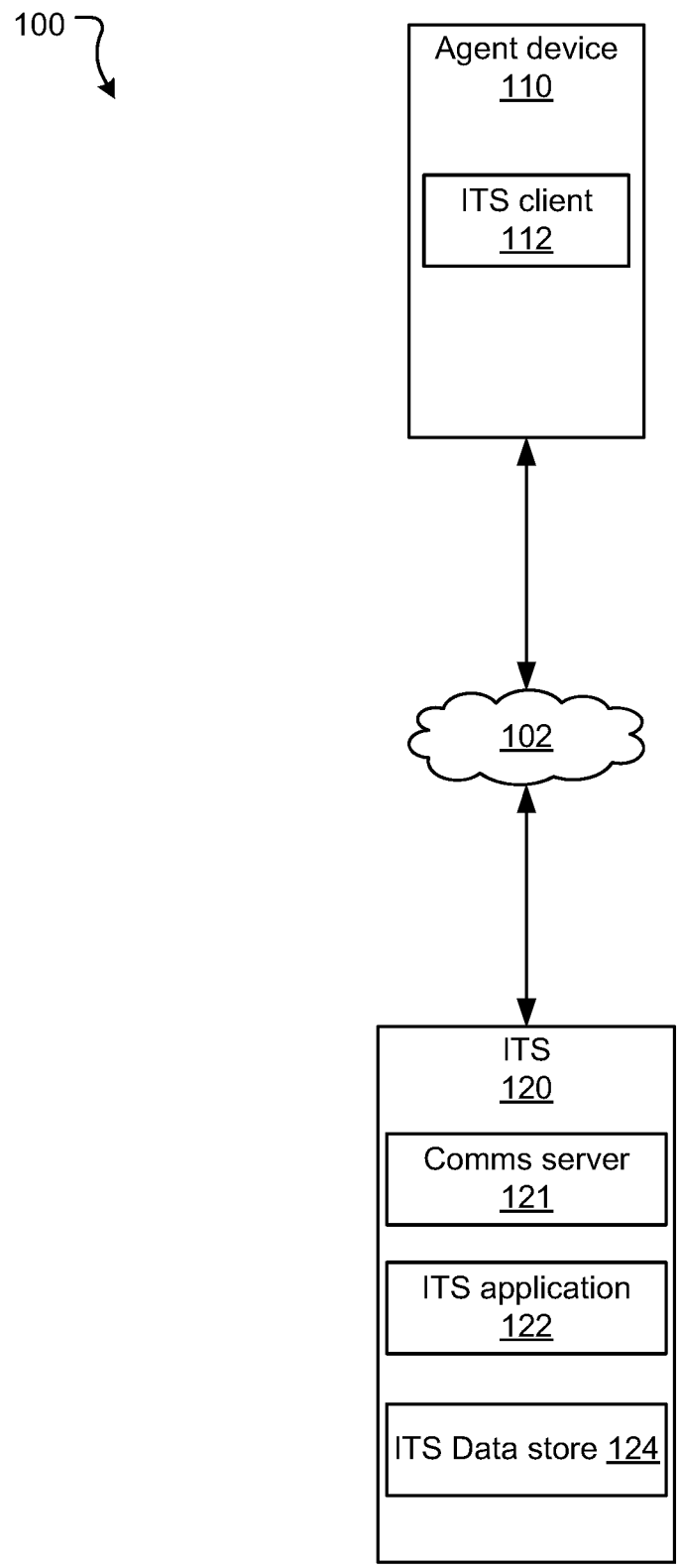
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

An issue tracking (ITS) (such as Applicant's "Jira"® suite of products) is application software that can be used to manage a wide range of tasks and projects. An ITS finds particular application in managing the service desk of an organization's information technology function. In this regard, an ITS allows the organization to design, plan, deliver, operate and control the services that it offers to clients (such as the organization's employees and contractors) through the information technology service desk.

When used in this domain, the users of an ITS (hereinafter referred to as "agents") create issues in the course of providing services to clients by way of the service desk. Once created, the ITS applies various actions to an issue, both automatically and in response to agent inputs. However in some cases, the systems used by agents to apply actions to issues are somewhat cumbersome and inefficient.

An overview of one example environment that includes an ITS in accordance with certain embodiments of the present disclosure will be described, followed by a description of a computer system which can be configured in various ways to perform the embodiments/various features thereof as described herein.

FIG. 1 illustrates an example environment 100 in which embodiments and features of the present disclosure are implemented. Example environment 100 includes a communications network 102 which interconnects an agent device 110 with an ITS 120.

Agent device 110 is a computer processing system with an ITS client application 112 installed thereon. Agent device 110 will also have other applications installed/running thereon, for example an operating system.

When executed by the agent device 110 (e.g. by a processor such as processor 204 described below), the ITS client application 112 configures the agent device 110 to provide client-side ITS functionality. This involves communicating (using a communication interface such as 218 described below) with the ITS 120 (and, in particular, an ITS application 122, such as Applicant's Jira Service Desk application). ITS client application 112 is typically a web browser (such as Chrome, Safari, Internet Explorer, Firefox, or an alternative web browser) which communicates with the ITS 120 by way of a web server using http/https protocols. IT client application 112 may also be a dedicated application client that communicates with the ITS application 122 using an API by way of an application server (described below).

Agent device 110 may be any form of computing device. Typically, agent device 110 is a personal computing device—e.g. a desktop computer, laptop computer, tablet computer, and in some instances a mobile phone. While a single agent device 110 has been illustrated, an environment would typically include multiple agent devices 110 interacting with the IT system 120. For example, when ITS application 122 manages an organization's information technology service desk, each agent working at the service desk accesses the ITS application 122 through their own agent device 110.

ITS 120 includes a Communication server 121, the ITS application 122, and an ITS data store 124. The ITS application 122 provides server-side ITS functionality. This involves receiving the data that agents input into ITS client applications 112 and the ITS client application 122 communicates to the ITS application 122 over communications network 102. The ITS application 122 is also responsible for storing such received data in ITS data store 124. In addition, ITS application 122 retrieves and processes data from ITS data store 124, generates web documents (that include necessary scripts and event listeners) therefrom and communicates web documents to ITS client applications 112 for display on the requisite agent device 110.

Communication Server 121 may be a web server (for interacting with web browser clients) or an application server (for interacting with dedicated application clients).

In certain embodiments, ITS 120 is a scalable system including multiple instances of the ITS application 122 distributed across distinct server nodes, each connecting to a shared data store 124 that resides on its own server (e.g. a shared file server). Depending on demand from agents (and/or other performance requirements), ITS 120 server nodes can be provisioned/de-provisioned on demand to increase/decrease the number of servers offered by the ITS 120. Each ITS application 122 may run on a separate computer system and include one or more application programs, libraries, APIs or other software that implement server-side functionality. Similarly, IT data store 124 may run on the same computer system as ITS application 122, or may run on its own dedicated system (accessible to ITS application(s) 122 either directly or via a communications network).

The ITS application 122 (running on ITS 120) and ITS client 112 (running on agent device 110) operate together to provide ITS functionality. Operations described herein as "ITS operations" or operations performed by the ITS, may be performed by the ITS client 112 (operating on agent device 110), the ITS application 122 (operating on ITS 120) or the ITS client application 112 and ITS application 122 in cooperation. For example, ITS operations involving the display of data involve displaying information on the agent device 110 (e.g. on a display such as 212) as controlled by the ITS client application 112. The data displayed, however, may be generated by the ITS client 112 itself, or generated by the ITS application 122 and communicated to the ITS client 112 therefrom. As a further example, ITS operations involving agent input involve the agent device 110 receiving user input (e.g. at input device 214) and passing that input to the ITS client 112. The information input may be processed by the ITS client 112 itself, or communicated by the ITS client 112 to the ITS application 122 to be processed by the ITS application 122.

Communications between the agent device 110 and ITS 120 in environment 100 are via the communications network 102. Communications network may be a local area network, public network (e.g. the Internet), or a combination of both.

While environment 100 has been provided as an example, alternative system environments/architectures are possible.

The embodiments and features described herein are implemented by one or more special-purpose computing systems or devices. For example, in environment 100 each of the agent device 110 and ITS 120, is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
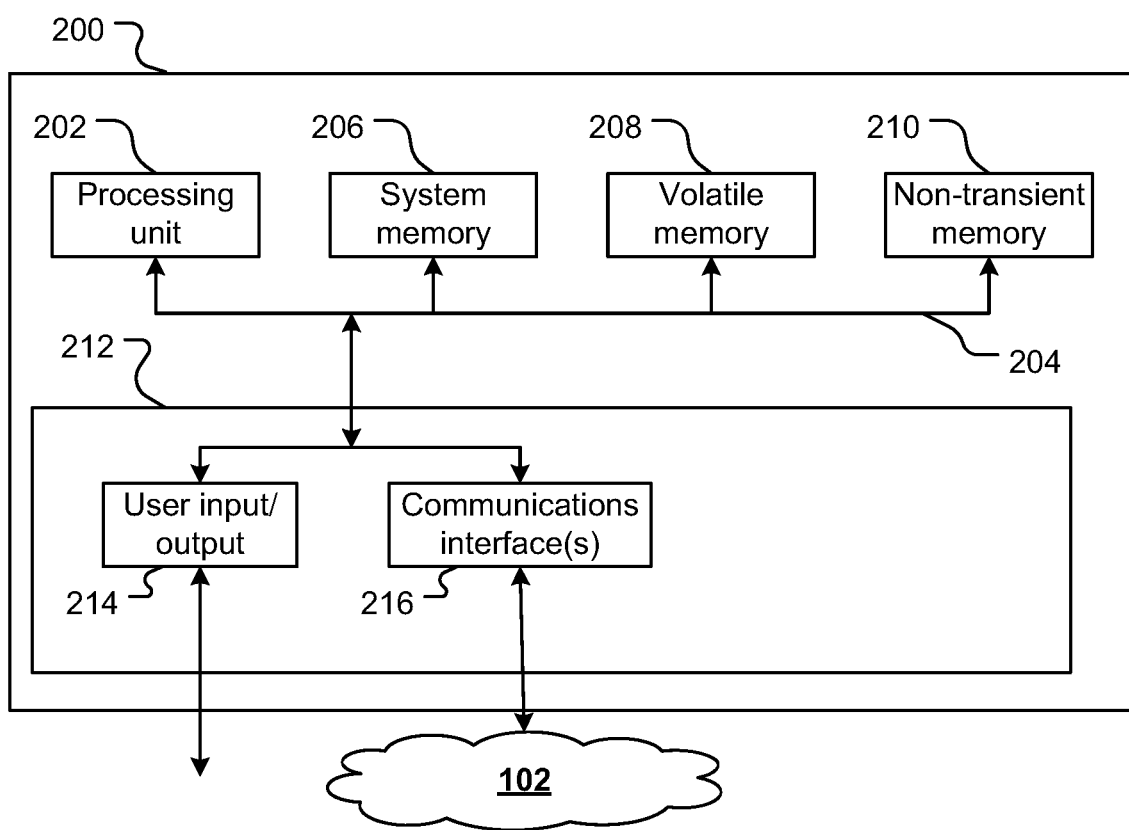
FIG. 2 is a block diagram of a computing system with which various embodiments of the present disclosure may be implemented.

By way of example, FIG. 2 provides a block diagram that illustrates one example of a computer system 200 which may be configured to implement the embodiments and features described herein. Computer system 200 includes a bus 202 or other communication mechanism for communicating information, and a hardware processor 204 coupled with bus 202 for processing information. Hardware processor 204 may be, for example, a general purpose microprocessor, a graphical processing unit, or other processing unit.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the techniques herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 108, network link 220 and communication interface 218.

As noted, computer system 200 may be configured in a plurality of useful arrangements, and while the general architecture of system 200 may be the same regardless of arrangements there will be differences. For example, where computer system 200 is configured as a server computer, it will typically be provided with higher end hardware allowing it to process data, access memory, and perform network communications more rapidly than, for example, an agent device (such device 110).

The following paragraphs describe various computer systems, computer-implemented methods and user interfaces that efficiently apply actions to the issues that are managed by ITS 120.

In this regard, when an ITS (such as ITS 120) is deployed to provide a service desk, system administrators create projects within the ITS (such as ITS application 122) that correspond to the service desks that the ITS is programmed to manage. For example, a system administrator may create a project in ITS application 122 to serve as an incident reporting and management facility. The ITS 120 usually provides a library of template projects that include certain baseline functionality and attributes, such as (in the service desk/incident management domain) incident queues, service requests and the like. When clients contact the service desk (such as by email or telephone) to report issues and/or seek assistance, the responding agent, using ITS client 112, creates an issue in the project. Issue-creation typically involves the agent entering pertinent information (such as that received from the client) into the ITS client 112 and the ITS client 112 communicating that information to the ITS application 122. The ITS application 122 in turn makes appropriate updates to the ITS data store 124.

In the service desk environment, ITS issues are often referred to as 'tickets'. In other words, the ITS 120 provides a service desk facility by receiving service requests and other reports from agents (by way of the ITS clients 112), assigning a ticket to each request/report and managing the tickets through to completion.

To provide a service desk facility (or indeed perform any issue tracking), ITS 120 includes a configurable state machine system. The state machine system allows system administrators to create workflows, which define the rules that govern how an issue may transition within the ITS from one status to another. Some workflows include automatic actions that occur as a result of an issue transitioning from one status to another. A detailed description of a configurable state machine system is not required for a thorough understanding of the present disclosure.

The present disclosure provides an improved ITS that more efficiently applies actions to issues, including transitioning issues from one status to another. In some embodiments, the present disclosure provides a user interface that both displays an issue queue and allows agents to select multiple issues directly from the queue. Such a user interface is advantageous, in that the multiple issue-selection functionality is built directly into the servicedesk workflow. This not only allows agents to select issues directly from an issues queue, but also allows lists of actions to be dynamically generated from the issues that are currently listed in the queue.

FIG. 3 illustrates a user interface 300 rendered by an ITS 120 in accordance with the present disclosure. In the illustrated embodiment, the ITS application 122 is Jira Service Desk, although other ITSs can be used including other Jira products such as Jira Core and Jira Software. User interface 300 is typically generated by ITS application 122 in the form of a web document that includes necessary scripts and event listeners. The web document is communicated to ITS client 112, which renders the document on agent device 110.

In the illustrated embodiment, user interface 300 relates to a project 302 named "IncidentManagement". The IncidentManagement project includes a number of queues. These are either automatically created from a suitable template or manually entered into the project by system administrators. The queues serve as filters, allowing the display of selected issues/tickets that have been created in the project. In the illustrated embodiment, user interface 300 displays a request queue 304 of all tickets that have a status of 'Open'. Such a request queue is advantageous for an agent working at a service desk, as it provides a visual indication of the agent's current workload. In the illustrated embodiment, request queue 304 lists five distinct tickets. In some embodiments, request queue 304 is an infinite-loading list that loads and displays a subset of the overall requests as the agent scrolls them into view.

In the illustrated embodiment, request queue 304 lists (in tabular form) the following request attributes:

Request type—the particular type of request/report received from the client. ITS application 122 provides a set of default request types for basic information technology help desk scenarios. System administrators can define more complex request types for their particular projects as needed. Request types are typically based on a more general issue type. For example, in the service desk scenario, a "Service Request" issue type could serve as the basis for two different request types, such as "Get IT help" and "Connect to wi-fi". In the illustrated embodiment, Request types are depicted schematically as request types "A", "B" and "C".

Key—a unique identifier assigned by ITS application 122 to each request.

Summary—a short textual summary of the request.

Reporter—the username of the agent who created the request.

Assignee—the username of the agent to whom the request is assigned to action.

Status—the current status of the request.

Created—the date of creation of the request.

For each request listed in queue 304, user interface 300 includes a select-request box 306. User interface 300 also includes a global select-request box 308. Although illustrated as checkboxes, the select-request boxes 306 and global select-request box 308 can be implemented with other user interface elements The select-request boxes 306 allow an agent to select one or more requests from the request queue 304. Selecting the global select-request box 308 selects all of the requests in the request queue 304.

FIG. 4 illustrates the state of user interface 300 after an agent selects a number of requests from request queue 304. In the illustrated embodiment, the agent has selected requests INC-2, INC-3 and INC-4 by interacting with each of those requests' select-request box 306. ITS client 112 automatically selects global select-request box 308 in response to detecting when an agent selects one of the select-request boxes 306. If the agent deselects the entirety of a previous selection, ITS client 112 automatically deselects global select-request box 308.

As noted above, in the illustrated embodiment, request queue 304 is an infinite-loading list that loads subsets of the entire set of requests as the agent scrolls through the request queue 304. Upon the ITS client 112 detecting that the agent has selected one of the issues in the request queue 304 (namely by selecting one of the select-request boxes 306), ITS client 112 disables list mutability, so that no further requests are loaded into the user interface 300. This is to ensure that selected requests are not inadvertently deselected by the agent scrolling a selected request out of view, and the ITS client 112 loading replacement requests into the user interface 300.

In the user interface illustrated in FIG. 4, the column headings of request attributes are replaced with an action menu 410. Action menu 410 lists a plurality of actions that the agent can apply to the selected request/s. In the illustrated embodiments, action menu 410 lists the following actions:

Link—link the selected requests to an issue;

Comment—enter a common comment on all selected requests;

Assign—assign the selected requests to another user for auctioning;

Transition—transition the selected requests to a different status; and

Delete—delete the selected requests.

ITS client 112 dynamically populates action menu 410 with actions that are pertinent to the request/s that the agent selects. The content of the action menu can also be generated by reference to the agent's authorisation level. In this regard, the ITS data store 124 maintains a comprehensive list of actions. ITS application 122 queries the list with the requests that the agent selected and returns a set of items the ITS client 112 for display on the agent device 120. In the illustrated embodiment, the actions: Link, Comment, Assign, Transition and Delete are pertinent to the actions INC-2, INC-3 and INC-4 and the agent has permission to perform those actions. However, as discussed below, the ITS client 112 displays an action menu 410 with different actions when the agent makes a selection of different issues.

FIG. 5 illustrates the state of the user interface 500 after the agent selects the "Transition" action from the action menu 410. Immediately after the ITS client 112 detects (typically using a suitable DOM event listener) that the agent has selected an action from the action menu 410, the ITS client 112 disables the select-request boxes 306. This is to ensure that the agent cannot add further (possibly inconsistent) requests to the selection.

After the ITS client 112 detects (typically using a suitable DOM event listener) that the agent has selected an action from the action menu 410, the ITS client 112 displays a refinement modal 510 that allows the agent to refine the selection. In the illustrated embodiment, refinement modal 510 includes an issue-selection menu 520 that allows the agent to filter the set of selected actions by reference to an issue type. Other refinements are possible such as by reference to time, assignee or issue status.

For the purpose of illustration, issue-selection menu 520 has two items "Iss 1" and "Iss 2", however those skilled in the art will appreciate that the items in an issue-selection menu will depend on the issues that are defined in the project workflow and the requests that are defined therefrom.

In the illustrated embodiment, issue-selection menu 520 lists the number of requests in the selection to which each issue listed in the issue-selection menu 520, relates. In particular, two requests (namely INC-2 and INC-4) are of issue type "Iss 1" and one request (namely INC-3) is of type "Iss 2".

FIG. 6 illustrates the state of user interface 600 after the agent selects "Iss 1" from the issue-selection menu 520. User interface 600 includes a transition modal 610 that includes a transition-selection menu 620. Transition-selection menu 620 allows the agent to select the status transition operation that will be applied to the selected requests. In the illustrated embodiment, transition-selection menu 620 lists two transitions, namely "Close" (which transitions the selected requests to the status of "Closed") and "Back to Work in Progress" (which transitions the selected requests to the status of "Work in Progress").

The transition operations in transition-selection menu 620 are listed for illustrative purposes only. Those skilled in the art will appreciate that the number and type of valid transition operations will depend on what is defined in the project workflow.

Transition-selection menu 620 lists the number of requests that each transition will be applied to. In the illustrated embodiment, both the "Closed" and "Back to Work in Progress" transitions will be applied to all of the selected requests (in this case 2 requests). However, depending on the rules that are defined in the project workflow, certain transitions may not be applied to all of the selected request. For example, if the set of requests that the agent selects comprises some issues that cannot have a status of "Work in Progress" and some that can, then the "Back to Work in Progress" transition can only be applied to the former requests.

In another embodiment, the transition-selection menu 620 only lists transitions that can be applied to all of the selected request.

Figure 7:
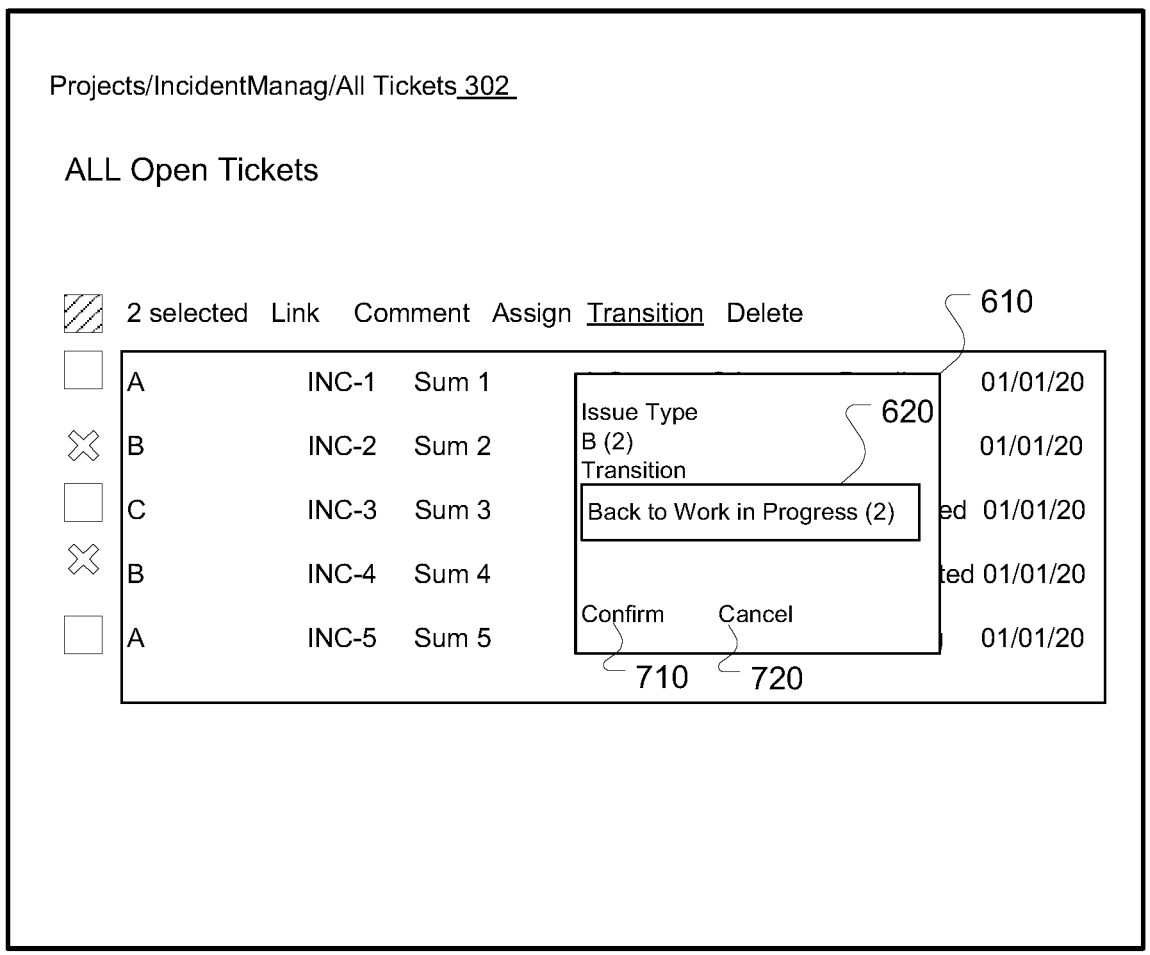

FIG. 7 illustrates the state of the user interface 700 after the agent selects the "Back to Work in Progress" transition operation from the transition-selection menu 620. User interface 700 includes a confirm button 710 and a cancel button 720 that respectively allow the agent to confirm or cancel the application of the selected transition operation.

FIG. 8 illustrates the state of the user interface 800 after the agent presses the confirm button 710. The ITS client 112 detects (using a suitable DOM event listener) the confirm button push, gathers the pertinent request and transition data and communicates the data to the communication server 121 for actioning by the ITS application 122. The ITS application 122 performs the requested transition and makes appropriate updates to the data store. User interface 100 includes a status window 810 that informs the agent that the selected transition operation is underway.

FIG. 9 illustrates the state of the user interface 900 after the ITS application 122 has applied the requested transition to the selected requests. User interface 900 includes a status window 910 that informs the agent about the success (or otherwise) of the transition operations. In the illustrated embodiment, the transition operation was wholly successful, in that the transition operation was performed on all two of the selected requests. In other scenarios, if the transition operation was not performed on all selected requests, the status window 910 indicates the reason/s why the operation was unsuccessful.

In the user interface 900 illustrated in FIG. 9, the status of Inc-2 and Inc-4 is updated to reflect the performing of the transition operation. In particular, user interface 900 shows the status of Inc-2 and Inc-4 as "Work in Progress".

A further embodiment of the present disclosure is illustrated in FIG. 10. FIG. 10 shows a user interface 1000 rendered by the ITS application 122 when the agent selects a different one of the project's issue queues. In user interface 1000, the issue queue is named 'Incidents" and lists different incidents that clients have reported to the service desk. User interface shows two incidents for the purpose of illustration, however in practice there may be many incidents listed. In real-word incident reporting, there can be many individual reports of incidents that are in fact all related to a single incident. For example, if there is an outage that impacts multiple servers (or even an entire data center), many clients will be affected, each of whom will report the incident to the servicedesk, triggering the creation of many issues/tickets.

User interface 1000 provides a facility for agents to link multiple tickets (each detailing a separate incident) to a single major incident. Such an operation is convenient for the agent, as it allows a major incident to be managed from a single location in the user interface. For example, in some scenarios, when a major incident is remedied (such as when servers or data centers are returned to operation), all of the constituent issues that arose from the incident are also resolve. If the individual tickets are linked to a major incident, a single operation performed on the major incident can be performed on all of the linked tickets.

In this regard, user interface 100 includes selection boxes 1010 adjacent to each listed ticket. The selection boxes allow the agent to select multiple issues as described above.

Figure 11:
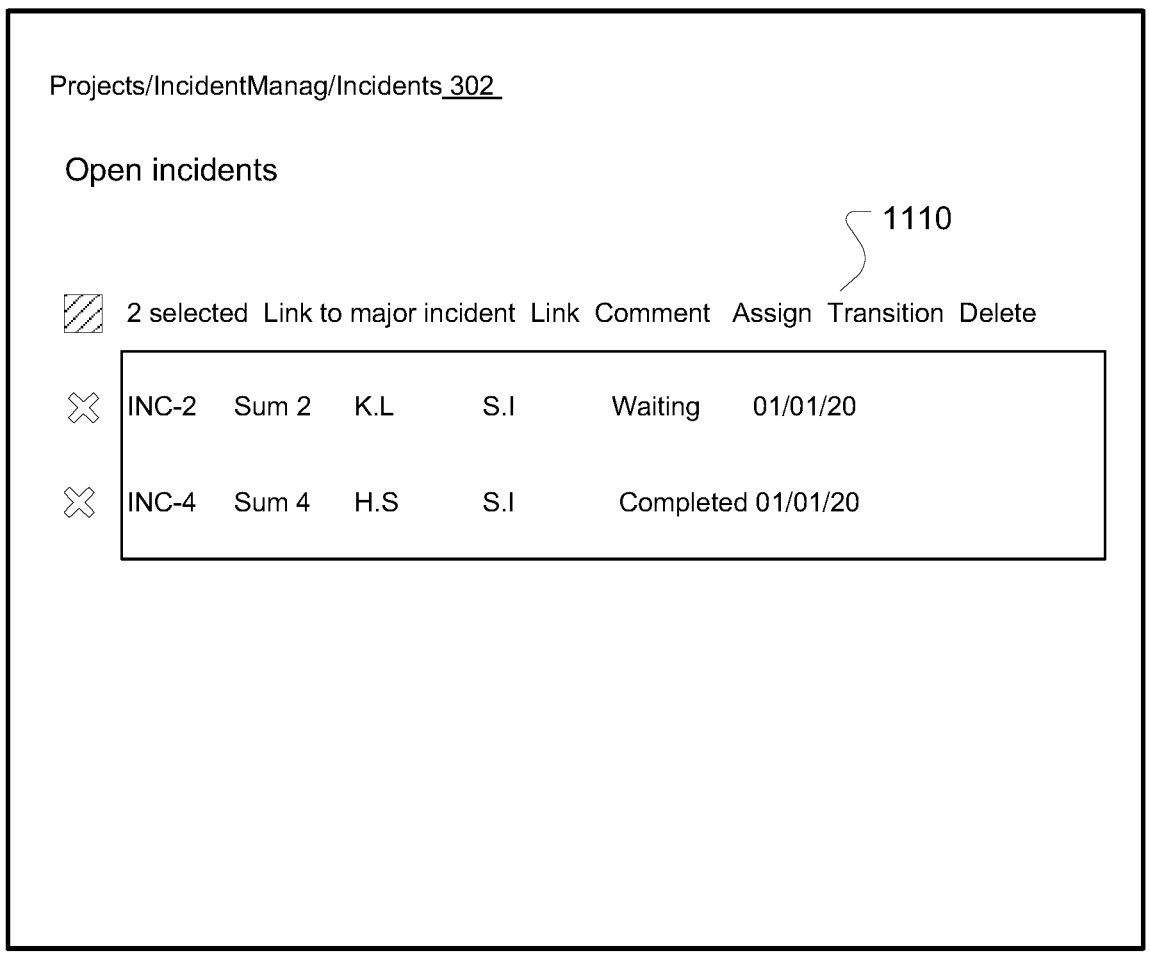

FIG. 11 shows the state of the user interface 1100 after the agent selects both of the illustrated incidents. In this illustrated embodiment, ITS application renders a user interface 1100 that includes an action menu 1110 populated with the following items:

Link to major incident—link selected issue to a major incident

Link—link the selected issues to another issue;

Comment—enter a common comment on all selected issues;

Assign—assign the selected issues to another user for auctioning;

Transition—transition the selected issues to a different status; and

Delete—delete the selected issues.

Figure 12:
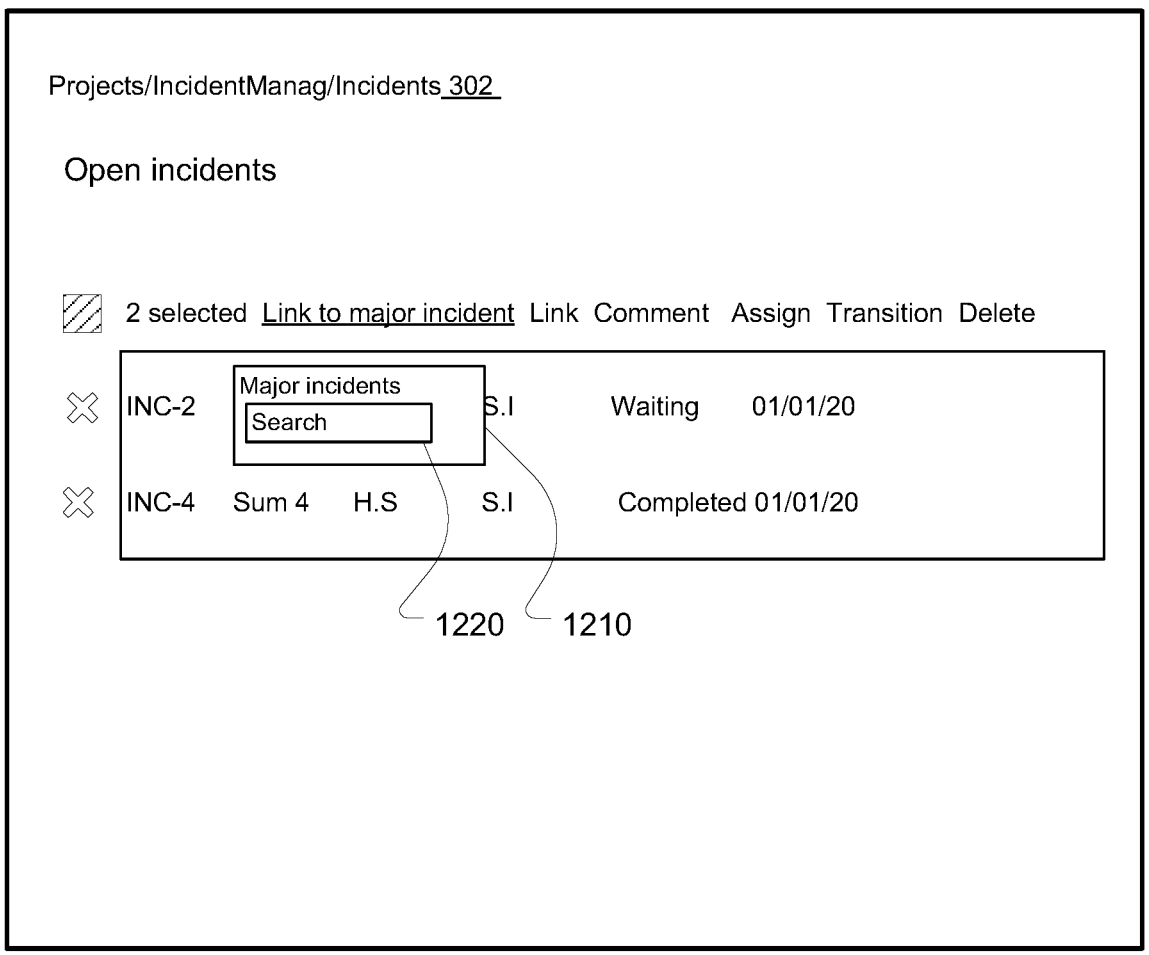

FIG. 12 shows the state of the user interface 1200 after the agent selects the "Link to major incident" action. User interface 1200 includes a link modal 1210 that includes a major incident search box 1220. Search box 1220 allows the agent to search for major incidents to which the selected incidents can be linked.

Figure 13:
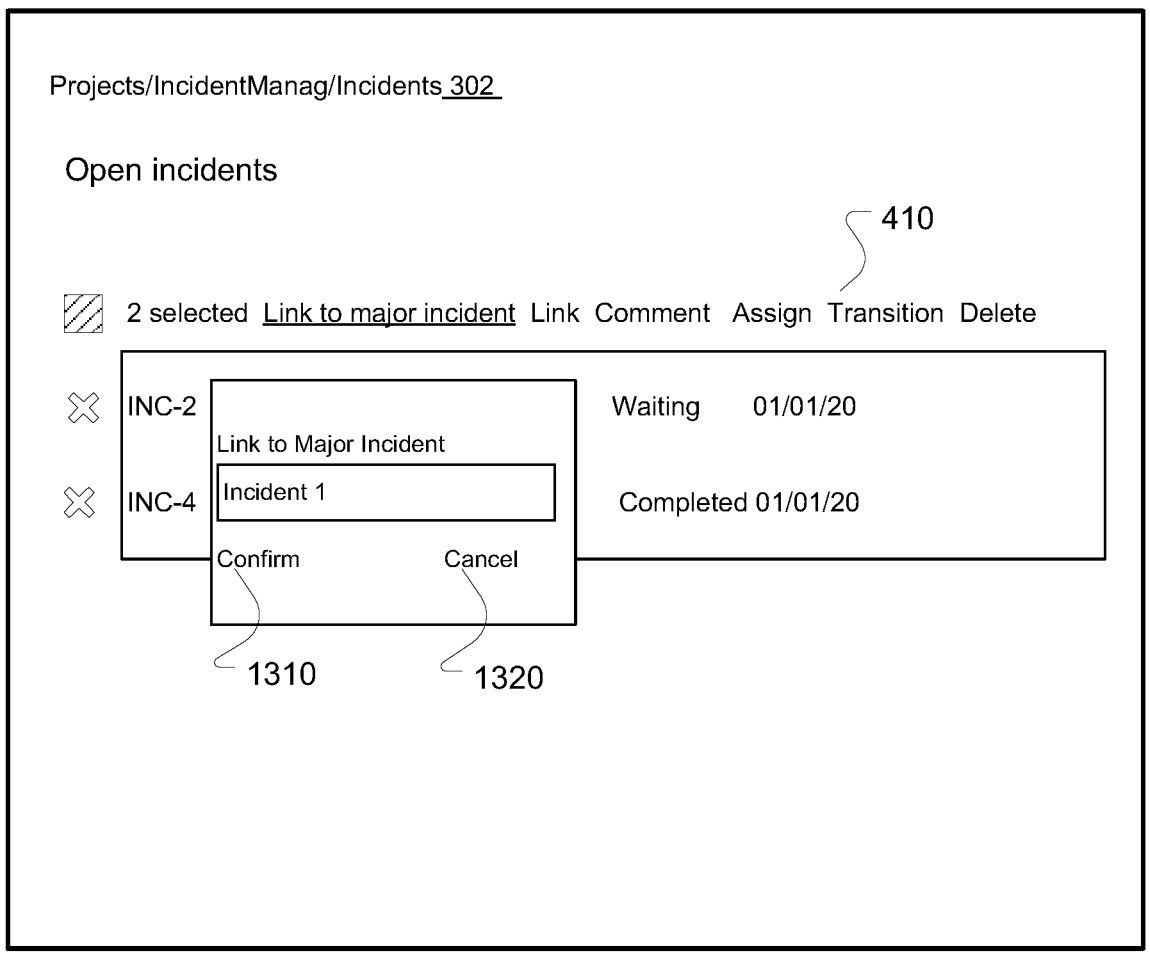

FIG. 13 illustrates the state of the user interface 1300 after the agent searches for and selects a major incident, named "Incident 1" for illustrative purposes. User interface 1300 includes a confirm button 1310 and a cancel button 1320 that respectively allow the agent to confirm or cancel the linking of the selected incident to the major incident.

Figure 14:
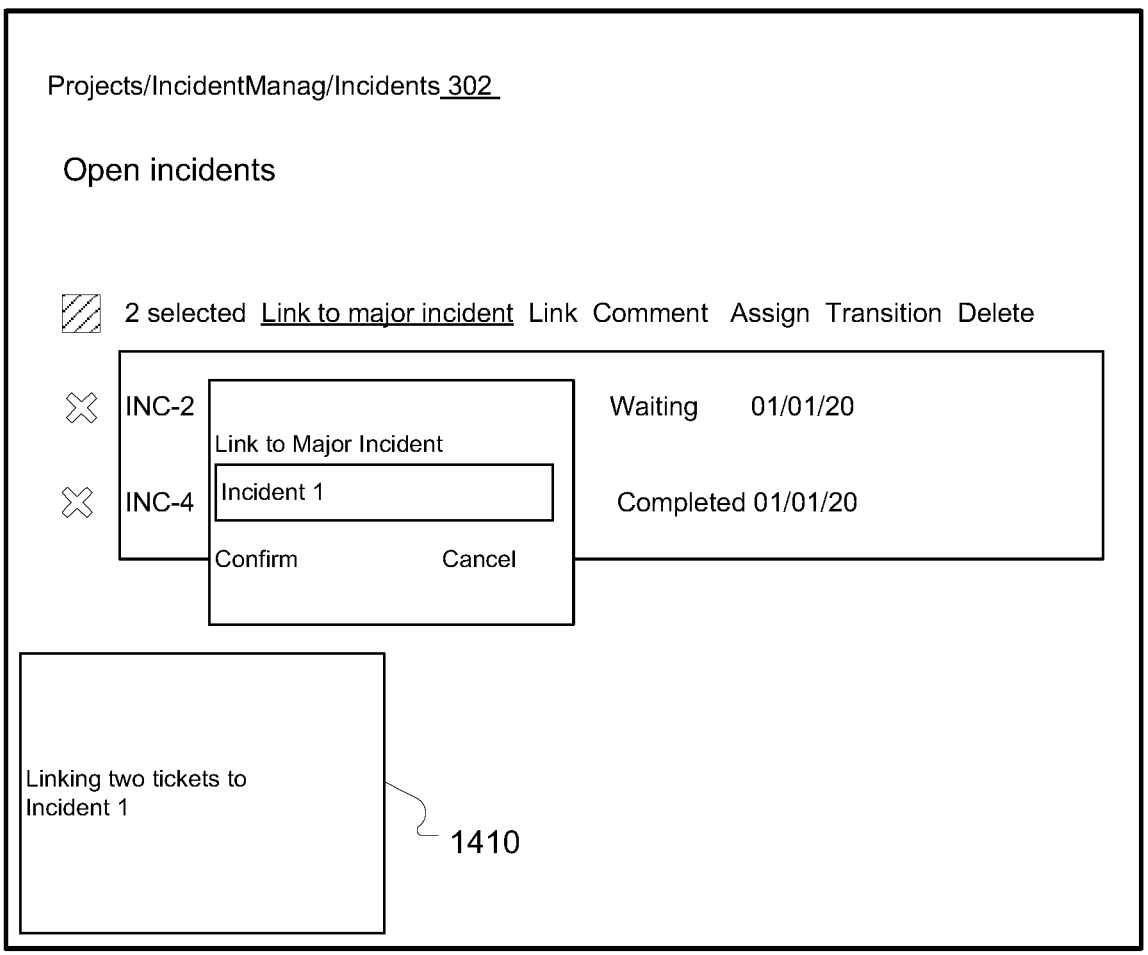

FIG. 14 illustrates the state of the user interface 1400 after the agent presses the confirm button 1310. The ITS client 112 detects (using a suitable DOM event listener) the confirm button push, gathers the pertinent incident and major incident data and communicates the data to the communication server 121 for actioning by the ITS application 122. The ITS application 122 performs the requested linking and makes appropriate updates to the data store. User interface 100 includes a status window 1410 that informs the agent that the selected major incident linking is underway.

FIG. 15 illustrates the state of the user interface 1500 after the ITS application 122 has linked the selected incidents to the major incident. User interface 1500 includes a status window 1510 that informs the agent about the success (or otherwise) of the major incident linking. In the illustrated embodiment, the linking was wholly successful, in that the linking operation was performed on both of the selected incidents. In other scenarios, if the linking operation was not performed on all selected requests, the status window 1510 indicates the reasons why the linking was unsuccessful.

Figure 16:
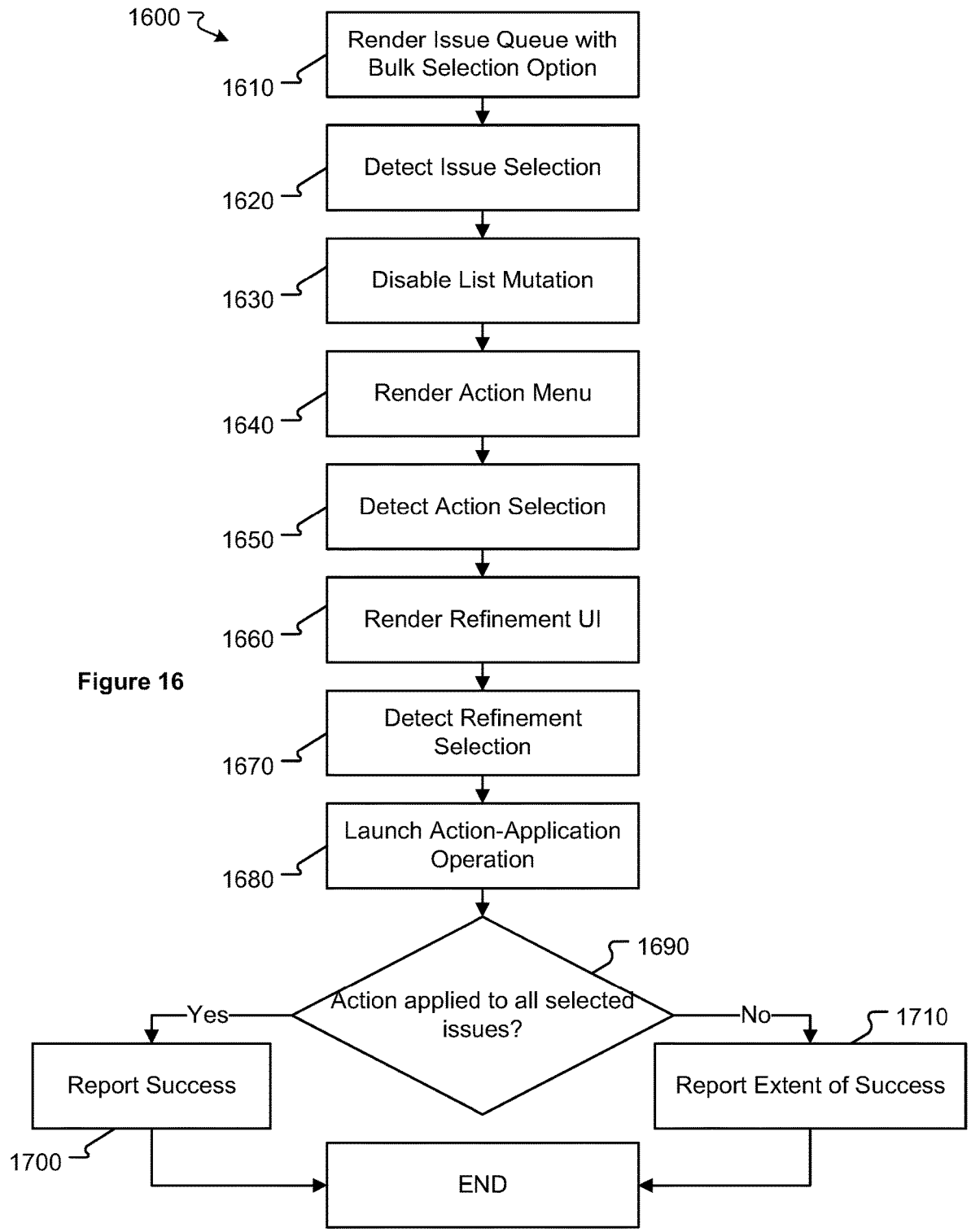
FIG. 16 is a flowchart indicating operations performed by an ITS in accordance with the present disclosure to provide bulk selection and actioning functionality to agents.

FIG. 16 is a flowchart 1600 indicating operations performed by the ITS 120 to provide bulk selection and actioning functionality to agents.

The process commences at step 1610 with the ITS client application 112 rendering on agent device 110, a user interface that includes an issues queue and a bulk-issue selection user interface element.

At step 1620, the ITS client application 112 detects the agent selecting one or more issues from the issues queue using the bulk-issue selection user interface element. The ITS client application 112 disables list mutability after it detects that the agent has selected one or more issues from the issues queue (step 1630).

At step 1640, the ITS client application 112 renders a user interface on agent device 110 that includes an action menu (or other suitable user interface element). As described above, an action menu is a user interface element that lists a plurality of actions that can be performed on the selected items.

At step 1650, the ITS client application 112 detects the agent selecting an action from the action menu. The ITS client application 112 disables further selection of issues after detecting the selection of an action from the action menu.

At step 1660, the ITS client application renders a user interface on agent device 110 that includes a refinement user interface element. The refinement element allows the agent to further filer and refine the set of selected issues by reference to various criteria. The ITS client application 112 detects the agent entering any refinements into the refinement element (step 1170).

At step 1680, the ITS client 112 launches an operation to apply the selected action to the selected issues. As described above, this typically involves the ITS client 112 communicating data pertaining to the selected action and issues, to the communication server 121 for actioning. Alternatively, the ITS client 112 may locally apply the action to the selected issues.

At step 1690, the ITS client 112 receives a response from the communication server 121 detailing the success or otherwise of the operation to apply the selected action to the selected issues. The ITS 112 client parses the data in the response and determines whether the action was successfully applied to all of the selected issues.

In the event that the operation was wholly successful, in that the selected action was applied to all of the selected issues, the ITS client 112 renders a user interface on agent device 110 to this effect (step 1700).

Conversely, in the event that operation was not wholly successful, the ITS client renders (step 1710) a user interface on ITS client 112 that quantifies the success of the operation. As described above, this can involve displaying in the user interface, the number of issues to which the action was not applied.

The process terminates after the applicable user interface is rendered.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. An issue tracking system (ITS) comprising:
one or more processors;
one or more non-transitory computer-readable storage media storing sequences of instructions which, when executed by the one or more processors, cause the one or more processors to:
render a user interface depicting:
a heading region comprising a set of column headings, each respective column heading identifying a respective issue ticket attribute; and
an issue ticket region below the heading region and displaying an issue ticket queue that includes a plurality of issue tickets defined in the ITS, wherein a displayed issue ticket includes a respective value for each of at least a subset of the issue ticket attributes displayed in the column headings;
receive, in the user interface, a selection of at least two issue tickets of the plurality of issue tickets;
in response to receiving the selection of the at least two issue tickets:
cease displaying the set of column headings in the heading region of the user interface; and
display, in the heading region of the user interface, a set of actions of a plurality of candidate actions, the set of actions selected based at least in part on the at least two issue tickets;
receive, in the user interface, a selection of an action of the set of actions; and
in response to receiving the selection of the action of the set of actions:
launch an operation to apply the selected action to the at least two issue tickets;
cease displaying the set of actions in the heading region; and
display the set of column headings in the heading region.

2. The ITS according to claim 1, wherein:
the selection of the at least two issue tickets is a first selection of at least two first issue tickets;
the set of actions is a first set of actions;
the operation is a first operation;
the selection of an action is a first selection of a first action; and
the sequences of instructions are further configured to cause the one or more processors to:
receive, in the user interface, a second selection of at least two second issue tickets of the plurality of issue tickets, the at least two second issue tickets different than the at least two first issue tickets;
in response to receiving the second selection of the at least two second issue tickets:
cease displaying the set of column headings in the heading region of the user interface; and
display, in the heading region of the user interface, a second set of actions of the plurality of candidate actions, the second set of actions selected based at least in part on the at least two second issue tickets and different from the first set of actions;
receive, in the user interface, a second selection of a second action of the second set of actions;
launch an operation to apply the selected second action to the at least two second issue tickets
cease displaying the second set of actions in the heading region; and
display the set of column headings in the heading region.

3. The ITS according to claim 2, wherein the first set of actions and the second set of actions are selected by reference to an agent authorisation level.

4. The ITS according to claim 2, wherein:
the first set of actions is selected by reference to transition rules defined for the at least two first issue tickets; and
the second set of actions is selected by reference to transition rules defined for the at least two second issue tickets.

5. The ITS according to claim 2, wherein the first set of actions includes linking the at least two first issue tickets to a common incident and transitioning the at least two first issue tickets to another status.

6. The ITS according to claim 1, wherein the instructions further cause the processor to disable mutability of the issue ticket queue upon detecting a selection of an issue ticket.

7. The ITS according to claim 1, wherein the instructions further cause the processor to prevent selection of further issue tickets upon detecting a selection of the action.

8. The ITS according to claim 1, wherein the instructions further cause the processor to render a user interface including a quantitative report of the issue tickets to which the selected action was successfully applied.

9. The ITS according to claim 2, wherein the actions of the first set of actions are selected, from the plurality of candidate actions, based on a determination that each action of the first set of actions is applicable to the at least two first issue tickets.

10. The ITS according to claim 9, wherein at least one action of the first second set of actions is not applicable to at least one of the at least two second issue tickets.

11. A computer implemented method comprising:
rendering a user interface of an issue tracking system (ITS), the user interface depicting:
a heading region comprising a set of column headings, each respective column heading identifying a respective issue ticket attribute; and
an issue ticket region below the heading region and displaying an issue ticket queue that includes a plurality of issue tickets defined in the ITS, wherein a displayed issue ticket includes a respective value for each of at least a subset of the issue ticket attributes displayed in the column headings;
receiving, in the user interface, a selection of at least two issue tickets of the plurality of issue tickets;
in response to receiving the selection of the at least two issue tickets:
cease displaying the set of column headings in the heading region of the user interface; and
displaying, in the heading region of the user interface, a set of actions of a plurality of candidate actions, the set of actions selected based at least in part on the at least two issue tickets;
receiving, in the user interface, a selection of an action of the set of actions; and
in response to receiving the selection of the action of the set of actions:
launching an operation to apply the selected action to the at least two issue tickets;
cease displaying the set of actions in the heading region; and
displaying the set of column headings in the heading region.

12. The method according to claim 11, wherein:
the selection of the at least two issue tickets is a first selection of at least two first issue tickets;
the set of actions is a first set of actions;
the operation is a first operation;
the selection of an action is a first selection of a first action; and
the method further includes:
receiving, in the user interface, a second selection of at least two second issue tickets of the plurality of issue tickets, the at least two second issue tickets different than the at least two first issue tickets;
in response to receiving the second selection of the at least two second issue tickets:
cease displaying the set of column headings in the heading region of the user interface; and
displaying, in the heading region of the user interface, a second set of actions of the plurality of candidate actions, the second set of actions selected based at least in part on the at least two second issue tickets and different from the first set of actions;
receiving, in the user interface, a second selection of a second action of the second set of actions;
launching an operation to apply the selected second action to the at least two second issue tickets
cease displaying the second set of actions in the heading region; and
displaying the set of column headings in the heading region.

13. The method according to claim 12, wherein the first set of actions and the second set of actions are selected by reference to an agent authorisation level.

14. The method according to claim 13, wherein:
the first set of actions is selected by reference to transition rules defined for the at least two first issue tickets; and
the second set of actions is selected by reference to transition rules defined for the at least two second issue tickets.

15. The method according to claim 12, wherein the first set of actions includes linking the at least two first issue tickets to a common incident and transitioning the at least two first issue tickets to another status.

16. The method according to claim 11, further including disabling mutability of the issue ticket queue upon detecting a selection of an issue ticket.

17. The method according to claim 11, further including preventing selection of further issue tickets upon detecting a selection of the action.

18. The method according to claim 11, further including rendering a user interface including a quantitative report of the issue tickets to which the selected action was successfully applied.

19. The method according to claim 12, wherein the actions of the first set of actions are selected, from the plurality of candidate actions, based on a determination that each action of the first set of actions is applicable to the at least two first issue tickets.

20. The method according to claim 19, wherein at least one action of the first set of actions is not applicable to at least one of the at least two second issue tickets.

* * * * *